United States Patent [19]
Young et al.

[11] Patent Number: 6,036,615
[45] Date of Patent: Mar. 14, 2000

[54] FORCED CONVECTION AXLE COOLING

[75] Inventors: David J. Young, Kimmell; Mark C. Barnholt, Ft. Wayne, both of Ind.

[73] Assignee: Dana Corporation, Toledo, Ohio

[21] Appl. No.: 09/239,236

[22] Filed: Jan. 28, 1999

[51] Int. Cl.[7] .................................................. F16H 57/04
[52] U.S. Cl. ........................................ 475/161; 74/606 A
[58] Field of Search ........................... 74/606 A; 475/161

[56] References Cited

U.S. PATENT DOCUMENTS

| | | | |
|---|---|---|---|
| 1,564,742 | 12/1925 | Acker | 74/606 A |
| 1,950,034 | 3/1934 | Mulford et al. | |
| 2,325,647 | 8/1943 | Adamson. | |
| 2,756,614 | 7/1956 | Kobayashi | 74/606 A |
| 5,191,813 | 3/1993 | Havens. | |
| 5,622,051 | 4/1997 | Iida et al. | 74/606 A |

*Primary Examiner*—Dirk Wright
*Attorney, Agent, or Firm*—Oldham & Oldham Co., L.P.A.

[57] ABSTRACT

A differential having a housing for receiving differential components. An input shaft, for example a drive pinion gear, is rotatably mounted within the differential housing. A drive line connection point is affixed to the drive pinion gear and is the mounting point for the drive shaft. A fan is disposed on the drive line connection point and is used to force air over the differential housing. The fan may be formed integrally with a drive train part, or be separable therefrom. Rotation of the fan forces air over the surface of the differential housing causing forced convection cooling of the differential components.

15 Claims, 2 Drawing Sheets

FORCED CONVECTION AXLE COOLING

FIELD OF THE INVENTION

The present invention relates to the differential axle assembly of an automobile or other vehicle. More specifically to method of cooling the differential with forced convection.

BACKGROUND OF THE INVENTION

Differential axle assemblies are well known structures that are commonly used in many vehicles. Such axle assemblies include beam or rigid axles as well as axles in vehicles with independent suspension. The typical differential is made up of a centralized carrier/housing assembly, to which axle tubes are directly or indirectly attached. The gears are housed in a portion of the differential housing called the differential carrier. Two main configurations of axle housings are commonly used. One configuration is of unitized construction and has a differential carrier integral to the center section of the differential housing. The axle tubes are directly attached to this carrier/housing. This type is commonly referred to as the carrier type, or also as the Spicer or Salisbury type. A second configuration employs a separable carrier unit to house the differential gears, with the entire gear and carrier assembly being removable as a unit from the front of the axle housing. This type is commonly referred to as the banjo or front-loader type. The unitized differential axle assembly includes an access opening in the rear of the housing for the insertion of the differential gearing and other components. This access opening is closed with a bolt fastened cover after the components have been installed the housing.

The typical differential axle assembly includes many gears and other parts to transmit the rotational force of the engine to the drive wheels of the vehicle. This is accomplished by connecting the differential between the drive line input or drive shaft, and a pair of output shafts or axles that extend to the drive wheels. The drive line or drive shaft assembly, is connected by affixing the rear universal joint to the differential at the drive line connection point. The drive line connection point typically consists of a pinion yoke or a pinion flange. The yoke or flange is non rotatably affixed to the input shaft or drive pinion gear by mating an internally splined portion of the flange or yoke to an externally splined portion of the drive pinion gear. The flange or yoke is then axially retained by a bolted connection. The drive pinion gear and pinion flange or pinion yoke assembly is rotatably mounted within the front portion of the differential carrier and the flange or yoke protrudes therefrom. The drive pinion gear transmits rotational force to the other parts of the differential assembly in a manner well known in the art.

Known differential axle assemblies have certain drawbacks associated with the current configurations. For example, it has been found that high loads and frictional forces encountered by the internal components of the differential generate a great deal of heat. The lubricating oil within the differential facilitates reducing the friction, and to some degree aids in cooling the components by conducting heat away from the surface of the internal parts. During normal operation of the vehicle, the dynamic internal parts of the differential propel the lubricant oil onto the inside surfaces of the differential housing. Heat is conducted from the oil to the differential housing and transmitted to the atmosphere through radiation and convection. During severe duty and high load conditions, such as might be encountered while towing a trailer, ascending steep inclines or many other situations, the lubricating oil may become excessively hot. The natural radiation and convection may not sufficiently cool the lubricant oil, causing the oil to break down and lose viscosity. Once in this condition, the oil cannot lubricate as needed. This causes the friction between the internal parts to increase and generate more heat, furthering the destructive cycle that ends in mechanical failure of the differential.

Therefore, improved cooling of the differential axle assembly, and the lubricating oil therein, would be desirable. Previous attempts to provide cooling in a differential have employed remote oil coolers that allow fluid communication between the housing and a separate cooler. These often require extensive modifications to the differential housing. Other methods include modifying the differential housing or internal parts to promote better cooling through altered fluid flow. This method usually requires complete redesign of the internal differential components to include a pump or alternate oil passages. The use of cooling fins on the housing or cover has also previously been employed. Many of these modifications are costly to produce and difficult or impossible to install on existing differential axle assemblies, and others are not efficient enough to remove the desired amount of heat from the differential.

SUMMARY OF THE INVENTION

In light of the deficiencies in prior art, the present invention provides an improved cooling system associated with a differential to allow effective cooling without is herein submitted. The present invention is therefore directed to a differential having a housing for receiving differential components. An input shaft, for example a drive pinion gear, is rotatably mounted within the differential housing. A drive line connection point is affixed to the drive pinion gear and is the mounting point for the drive shaft. A fan is disposed on the drive line connection point and is used to force air over the differential housing.

The present invention provides the advantage of producing an air flow over the surface of the differential, causing cooling of the differential housing through forced convection, to thereby effectively transfer heat from the lubricating oil therein.

DETAILED DESCRIPTION OF THE INVENTION

Figure 1:
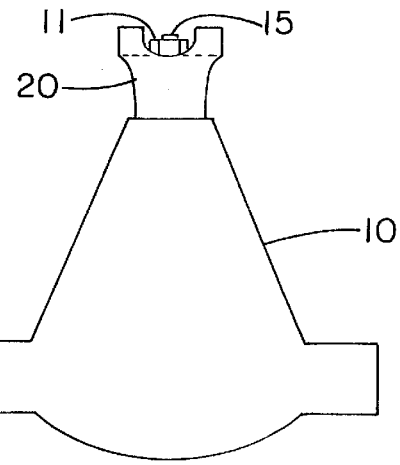
FIG. 1 is a top view of the center section of a differential with one form of drive line connection point.

Turning now to the Figures, FIG. 1 shows the general environment to which the present invention is directed, and shows the center section of a vehicle differential 10. The differential 10 includes a pinion yoke 20 as the drive line connection point. This drive line connection is typical, with the rear universal joint of a vehicle drive shaft (not shown) being affixed to pinion yoke 20, such that when the drive shaft is rotated by means of the vehicle engine and transmission (not shown), the shaft will transmit rotational force to the yoke 20 and therefore to a drive pinion gear 15. Pinion yoke 20 may be of a standard configuration well known in the art. A splined connection is generally used to non rotatably affix pinion yoke 20 the drive pinion gear 15, and nut 16 axially retains pinion yoke 20 thereon. Pinion yoke 20 and drive pinion 15 are rotatably mounted with respect to differential carrier 10.

Figure 2:
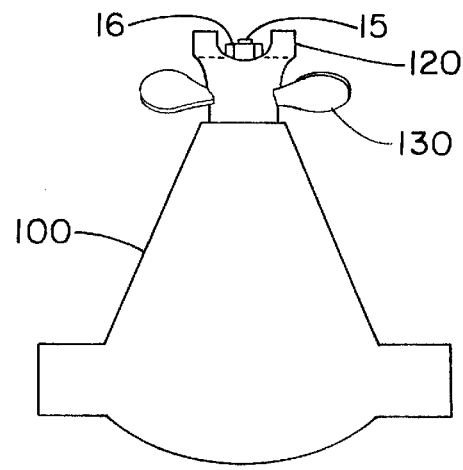
FIG. 2 is a top view of the center section of the differential shown in FIG. 1, with a first preferred embodiment of the present invention installed thereon.

In this environment, the differential 10 is exposed to significant elevated temperatures generated from the vehicle engine and other drive line components. Additionally, as earlier described, the differential also generates heat from the internal components and gearing to transfer power from the drive shaft to the vehicle wheels. Lubrication for these components is generally supplied by oil or other lubricating fluid in the differential case. To facilitate cooling of the differential to lengthen the lubricating fluid life and functionality, the invention in accordance with a first preferred embodiment is shown in FIG. 2. In FIG. 2, the center section of a differential 100 is shown to include pinion yoke 120 with an integral fan 130. Pinion yoke 120 with integral fan 130 is affixed to the drive pinion gear 15 with a splined and bolted connection or other suitable coupling. When yoke 120 is rotated, the fan 130 in turn is rotated to force a flow of air over the surface of differential housing 100. This forced convection flow cools differential housing 10, which in turn cools the internal oil. Fan 130 is shown as an integral part of pinion yoke 120. However, a separate fan may be attached with bolts or other suitable methods of connection to a standard pinion yoke, without departing from the spirit of the present invention.

Figure 3:
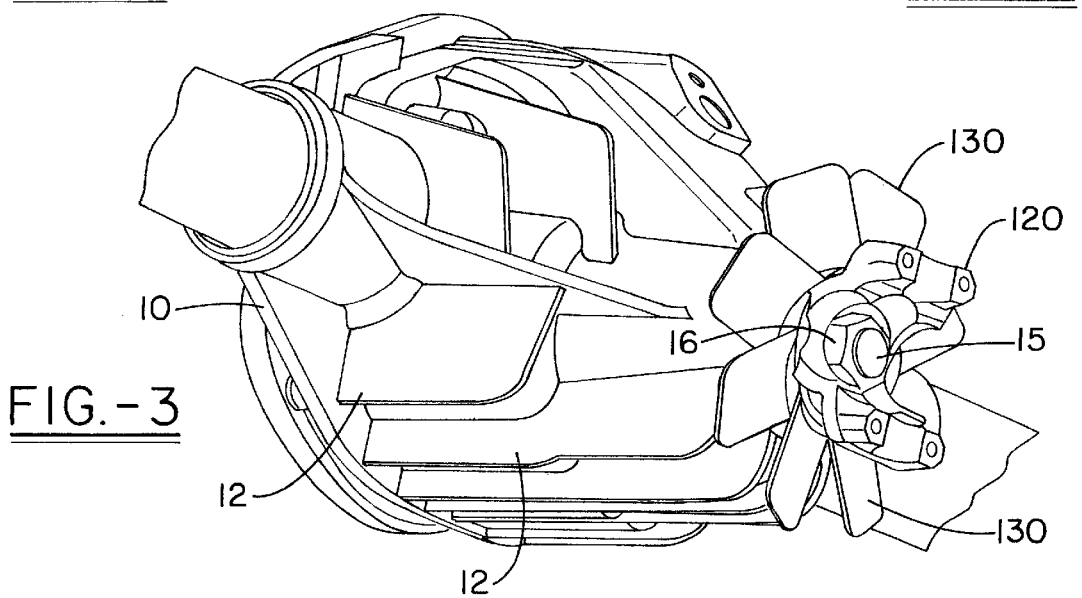
FIG. 3 is a perspective view of the center section of a differential shown in FIG. 2, with a first preferred embodiment of the present invention installed thereon.

As seen in FIG. 3 which is a perspective view of FIG. 2, the pinion yoke 120 forms the drive line connection point for differential 100. The fan 130 is formed as an integral part of pinion yoke 120, and has blades extending radially from the axial centerline. The blades may be of any size, number and inclined at a pitch angle that will promote the required air flow. Pinion yoke 120 with integral fan 130, may be installed on differential 100 in place of a standard pinion yoke. Preferably, pinion yoke 120 with integral fan 130 is non rotatably affixed to drive pinion 15 as previously described, such as by a standard splined and bolted connection. Drive pinion 15 and pinion yoke 120 with integral fan 130 are rotatably mounted with respect to the case of differential 100. As rotational force from the vehicle drive line is transmitted to pinion yoke 120, integral fan 130 is concomitantly rotated to automatically cause the forced convection cooling airflow over the differential upon operation of the vehicle. Fan 130 is configured so that when it is rotated, it forces air over the surface of differential 100. The air flow over the surface of differential 100 generated by the rotation of fan 130, acts to cool the differential through forced convection. Further, the differential 100 may include secondary cooling system such as a plurality of heat conducting members or cooling fins 12 on the exterior of the case. These cooling fins 12 will act to increase the efficiency of the cooling effect, but are not required as part of the present invention. Cooling fan 130 and alternate embodiments thereof, will operate with a standard differential, and may also be used in combination with secondary cooling methods to include finned differential housings and covers, or with integral and/or remote oil coolers.

Figure 4:
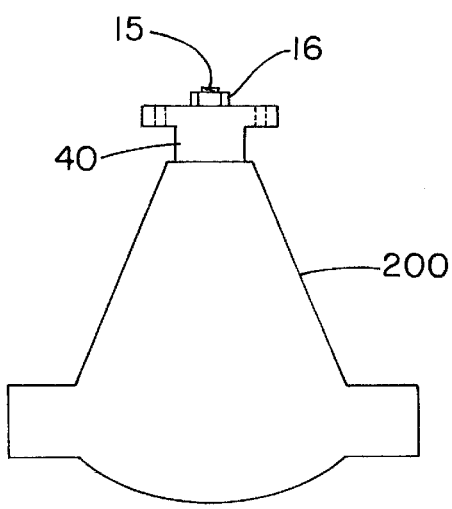
FIG. 4 is a top view of the center section of a differential with a second form of drive line connection point.
Figure 5:
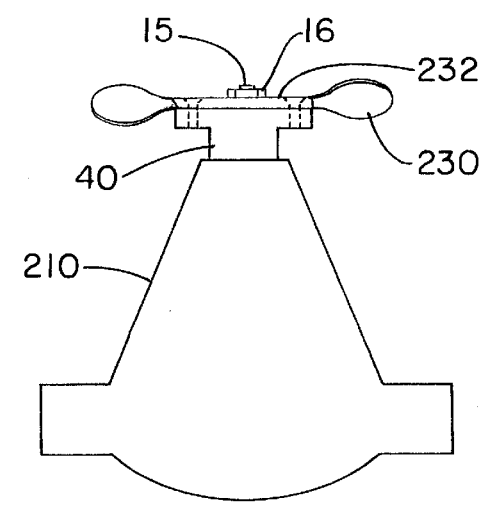
FIG. 5 is the differential of FIG. 4, with a second embodiment of the present invention installed thereon.

Turning to an alternative embodiment of the invention, FIG. 4 shows the center section of a differential 200, having a pinion or companion flange 40 as the drive line connection point. Pinion flange 40 differs in construction from the previously described pinion yoke, but is similar in purpose and function. Pinion flange 40 is of a configuration well known in the art. Pinion flange 40 typically is a flat faced circular flange that is fastened to a corresponding flat faced flange on the rear universal joint of the drive shaft (not shown). Rotational force is transmitted to the pinion flange and therefore to drive pinion 15. Pinion flange 40 is non rotatably affixed to the drive pinion gear 15 with a splined connection and is axially retained by nut 16. Pinion flange 40 and drive pinion 15 are rotatably mounted within differential carrier 10. An alternative embodiment is shown in FIG. 5 along with a differential as shown in FIG. 4. In this embodiment, a forced convection cooling system is installed on pinion flange 40. More particularly, fan 230 is disposed on the flat face of pinion flange 40, and will be secured in this position upon installation of the drive line. Pinion flange 40 and the corresponding flange on the rear universal joint of the drive shaft (not shown), secure hub 232 of fan 230 when these two flanges are fastened together. Once assembled, fan 230 is fixed in position with respect to pinion flange 40, and therefore rotates when flange 40 rotates. The cooling function and benefits thereof for fan 230 are similar to that previously described for the first preferred embodiment. Fan 230 is shown as a separate part, but may also be incorporated as an integral part of pinion flange 40 or alternatively could be attached to the flange 40 before the axle assembly without departing from the spirit of the invention.

Figure 6:
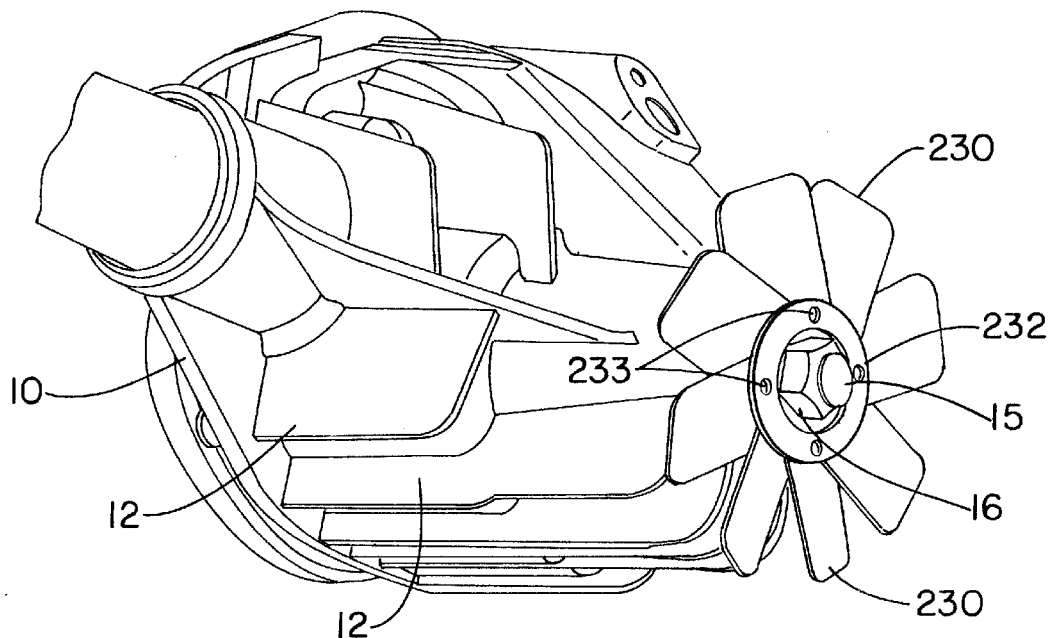
FIG. 6 is a perspective view of the center section of a differential shown in FIG. 5, having a second preferred embodiment of the present invention installed thereon.

FIG. 6 is a perspective view of the center section of a differential 200 as shown in FIG. 5. Fan 230 is disposed on pinion flange 40 (not shown). Fan 230 has a center hub 232 that has holes 233 disposed therein. The shape of hub 232 and the location of holes 233, are configured to correspond with the shape and bolt hole location of the underlying pinion flange 40, so that hub 232 of fan 230 shares a common bolt hole pattern with flange 40. Holes 233 secure fan 230 in position on flange 40 when the corresponding drive shaft flange (not shown) is bolted in place. However, fan 230 may be held in place by any method of connection that secures it in fixed rotation with flange 40, without departing from the spirit of the invention. Rotational force from the drive shaft is then transmitted to pinion flange 40 and therefore fan 230 is also rotated. Fan 230 is configured so that when it is rotated, it forces air over the surface of differential 200. The air flow generated by the rotation of fan 230, acts to cool the differential through forced convection. Differential 200 may again include cooling fins 12 if desired, to increase the efficiency of the cooling effect, but are not required as part of any embodiment of the present invention. Cooling fan 230 and alternate embodiments thereof, will operate with a standard differential, and in combination with secondary cooling methods to include finned differential housings and covers, along with integral and remote oil coolers.

Figure 7:
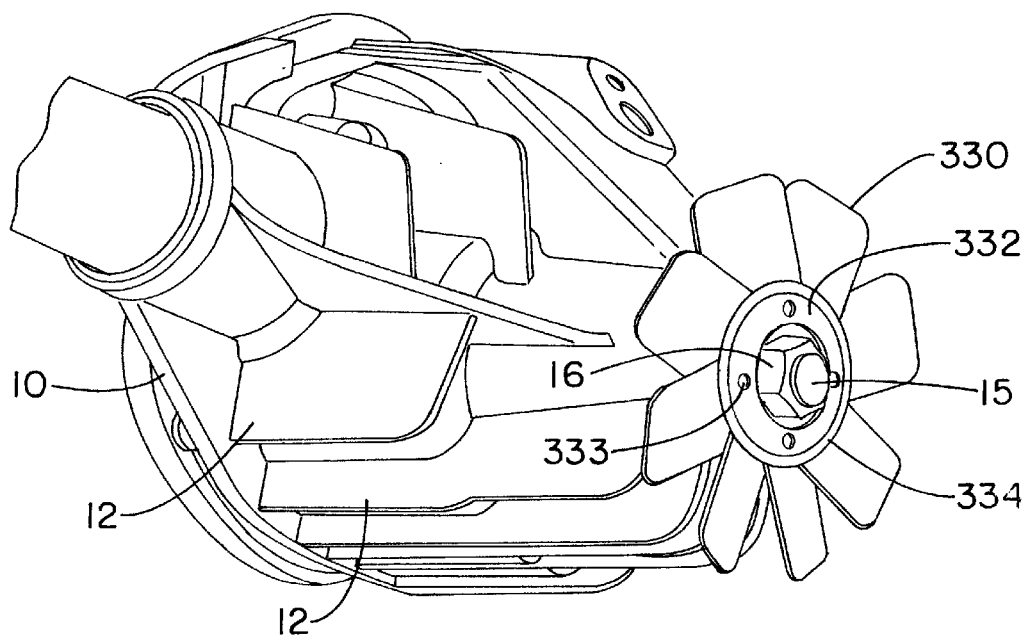
FIG. 7 is a perspective view of the center section of a differential having a third preferred embodiment of the present invention installed thereon.

A further preferred embodiment of the invention is shown in FIG. 7. In this embodiment, a fan 330 is disposed on pinion flange (not shown) and affixed in place in a manner previously described for FIG. 6. Fan 330 differs in function from those fans previously described in that fan 330 is rotatably affixed to center hub 332 in association with a clutch 334. In a preferred embodiment, clutch 334 is thermally activated and engages fan 330 to rotate with center hub 332 when the differential reaches a predetermined temperature. Activation of clutch 334 may be initiated upon sensing a predetermined temperature of the lubricating fluid or oil in the differential, by means of an appropriate temperature sensor within the differential housing. In this manner, the clutch is only activated when additional cooling is required, and then disengages when the differential is cool and the temperature falls below a second predetermined point. Although a temperature sensor may be used to activate the clutch and cooling mechanism, other methods may be used to engage clutch 334 such as a centrifugal lockup. Clutch 334 allows fan 330 to operate only when it is necessary. FIG. 7 shows fan 330 having clutch 334 in conjunction with a flange type drive line connection point. However, a clutch operated fan may also be used with a yoke type or any other drive line connection point without departing from the spirit of the present invention.

The differential shown in the accompanying drawings is of the Salisbury or Spicer type having a unified carrier and housing. The present invention is not limited in application to this type of housing, and may be installed on virtually any type of differential including but not limited to, the banjo or front loader type, as well as axles of vehicles with independent suspension.

The foregoing describes the preferred embodiments of the present invention, it is to be understood that the invention is not limited thereto, but only as defined in the appended claims.

What is claimed is:

1. A differential comprising:
   a housing portion for receiving differential components;
   an input shaft rotatably mounted in said housing;
   a drive line connection point disposed on said input shaft;
   a fan disposed on said drive line connection point.

2. A differential as recited in claim 1, wherein said fan is an integral part of said drive line connection point.

3. A differential as specified in claim 1, wherein said fan is a separate part that is affixed to said drive line connection point.

4. A differential as specified in claim 1, wherein said drive line connection point is a yoke.

5. A differential as recited in claim 1, wherein said drive line connection point is a flange.

6. A differential according to claim 1, wherein said fan rotates in unison with said drive line connection point and said input shaft.

7. A differential according to claim 1, wherein said fan has a clutch, said fan selectively rotates in unison with said drive line connection point and said input shaft.

8. A differential as recited in claim 1, wherein said fan has at least one surface inclined to move air over the surface of said differential.

9. A differential as specified in claim 7, wherein said clutch is thermally activated.

10. A differential as recited in claim 7, wherein said clutch is centrifulgally activated.

11. A differential as recited in claim 1, wherein said housing portion includes a plurality of heat conducting members associated therewith.

12. A differential as recited in claim 1, further comprising a secondary cooling system associated therewith to supplement cooling of the differential.

13. A differential as recited in claim 9, wherein said fan is activated when the temperature of a lubricating fluid within said housing is at or above a predetermined temperature.

14. A differential as recited in claim 7, wherein said drive line connection point is a flange and said clutch is operatively coupled between said flange and said fan.

15. A differential as recited in claim 7, wherein said drive line connection yoke and said clutch is operatively coupled between said yoke and said fan.

* * * * *